(12) United States Patent
Bao et al.

(10) Patent No.: US 7,884,711 B2
(45) Date of Patent: Feb. 8, 2011

(54) CONTAINER ARRANGEMENT TAG HAVING POSITIONING AND ELECTRONIC SEALING FUNCTION

(75) Inventors: Qifan Bao, Shanghai (CN); Jianhua Li, Shanghai (CN); Yongxiang Gao, Shanghai (CN); Tinglong Dong, Shanghai (CN)

(73) Assignee: Shanghai International Port (Group) Co., Ltd., Shanghai (CN)

( * ) Notice: Subject to any disclaimer, the term of this patent is extended or adjusted under 35 U.S.C. 154(b) by 452 days.

(21) Appl. No.: 12/002,503

(22) Filed: Dec. 15, 2007

(65) Prior Publication Data

US 2009/0151406 A1 Jun. 18, 2009

(51) Int. Cl.
*G08B 1/08* (2006.01)
(52) U.S. Cl. ............................ 340/539.13; 340/545.1
(58) Field of Classification Search ............ 340/539.13, 340/539.1, 541, 545.1, 545.2, 548, 545.6
See application file for complete search history.

(56) References Cited

U.S. PATENT DOCUMENTS

| 6,039,365 | A  | * | 3/2000  | Rogatnev ............... 292/327 |
| 6,962,376 | B2 | * | 11/2005 | Palzkill et al. ............. 292/327 |
| 7,042,354 | B2 | * | 5/2006  | Auerbach et al. ....... 340/539.31 |
| 7,339,469 | B2 | * | 3/2008  | Braun .................... 340/539.13 |
| 7,438,334 | B2 | * | 10/2008 | Terry et al. ................. 292/327 |
| 2008/0315596 | A1 | * | 12/2008 | Terry et al. ................. 292/327 |
| 2009/0026773 | A1 | * | 1/2009  | Terry et al. ................. 292/327 |
| 2009/0115202 | A1 | * | 5/2009  | Terry et al. ................. 292/327 |
| 2009/0126424 | A1 | * | 5/2009  | Terry et al. ..................... 70/63 |
| 2009/0146437 | A1 | * | 6/2009  | Terry et al. ................. 292/281 |
| 2009/0179437 | A1 | * | 7/2009  | Terry et al. ................. 292/327 |

\* cited by examiner

*Primary Examiner*—Travis R Hunnings

(57) ABSTRACT

The electronic tag of the present invention is mounted under the door holder on the front and right side of the container and the lock bolt on the electronic tag is inserted into the holes of the container door handle and the door seal turnover panel. The lock cap screws to the lock bolt tightly, so that the lock bolt can not be pulled out from the electronic tag. The electronic tag adopts RFID technique, GPS satellite positing and identifying technique and un-touching approach switch door seal technique. When the lock cap screws onto the lock bolt, the door closing information is recorded; when the lock cap screws out from the lock bolt, the door opening information is recorded. The present invention identifies, reads and writes the freight information, logistics information, door seal information of the container through the electronic tag in an un-touching manner. The electronic tag has large storage volume, long life span, and good security. Besides, the electronic tag also has GPS that can position and identify the position of the container.

3 Claims, 3 Drawing Sheets

CONTAINER ARRANGEMENT TAG HAVING POSITIONING AND ELECTRONIC SEALING FUNCTION

BACKGROUND OF THE PRESENT INVENTION

1. Field of Invention

The present invention relates to a container electronic tag, and more particularly to an electronic tag arrangement mounted on the container door having positioning and electronic sealing function.

2. Description of Related Arts

At present, the technique adopted in the container freight has many problems.

(1) The container door seal mainly use steel-wire rope having a lead seal number. When the container door is closed, the door handle is inserted into the door holder, the steel-wire rope passes through the holes of the door handle and door seal turnover panel, and lead seal clips the steel-wire rope. Record the lead seal number, so as to prevent the container opening in the freight. This drawback of this method is that the steel-wire rope and lead seal can be forged. After the container is opened, the cargo can be stolen.

(2) China patent application ZL200420037164.3 discloses a container electronic tag device comprising an electronic tag, a reader and writer, and an antenna. The electronic tag is mounted on the surface of the container, the reader and writer and the antenna are integrated as one or separately mounted on the transportation or the hanging pathway. The electronic tag identifies the container information, and tracks and records the logistics information of the container in the freight, which greatly improves the working efficiency of the container freight, and the reliability and security of the container identification and the reading and writing of the logistics information. But this invention fails to record the container position information.

(3) China patent application 200510028094.4 discloses a connecting method of a container electronic tag and an electronic seal. The electronic tag and the electronic seal are mounted on the surface of the container, and the electronic seal in provided with optical sensor. While operating, the optical sensor on the electronic seal can detect the opening times of the container door, and whether the container is invaded, which can satisfy the demand of safety, such as prevention of terrorist and intruder. The electronic tag records the container seal information, and secures the safety of cargo during the freight of the container. This method physically connects the electronic tag and electronic seal. The drawback of this method is that the connection of the electronic tag mounted on the container surface and the door seal can damage the container surface and cause inconvenience in mounting. Further more the electronic seal follows the container and can not utilized repeatedly.

(4) At present, the container does not have GPS positioning function during the freight, and the location of the container during the freight can not be determined.

SUMMARY OF THE PRESENT INVENTION

A main object of the present invention is to provide a container electronic tag having positioning and electronic sealing function, wherein the electronic tag can identify the container number and position, and track and record the logistics and door seal information during the freight in a un-touching manner.

Accordingly, in order to accomplish the above object, the present invention provides a container electronic tag having positioning and electronic sealing function.

A container electronic tag arrangement having positioning and electronic sealing function used on a container having a door that comprises a door handle and door seal turnover panel, comprising: an electronic tag mounted on a front and right side of the container, comprising a GPS electronic element for detecting the container position while opening and closing, a signal transceiver for transmitting and receiving information signals, a microprocessor for recording container position information while opening and closing, and a switch for sending opening and closing signals to the microprocessor; and a container lock comprises a lock bolt integrated with the electronic tag and a lock cap adapted for screwing onto the lock bolt, whereby while insert the lock bolt on the electronic tag into a hole of the door handle and the door sealing turnover panel respectively, and screw the lock cap onto the lock bolt, the switch sends signal to the microprocessor, and the microprocessor records the opening and closing information.

The GPS electronic element is a GPS positioning chip or an external reader and writer with GPS function for recording geographical information.

The electronic tag further comprises a moveable transmitting pole provided in middle of the block bolt of the electronic tag, wherein the transmitting pole comprises an elastic element mounted thereunder connecting to the switch.

The switch is a limit switch or an un-touching approach switch.

The lock cap has a cavity therein for receiving the lock bolt, whereby when the lock cap is screwed out from the lock bolt, the holes of the door handle and door seal turnover panel are detached. The lock cap has inner drum thread, and comprises a magnet imbedded thereon.

The signal transceiver is signal frequency or double frequency.

Comparing to the present electronic tag, the electronic tag of the present invention is mounted under the door holder on the front and right side of the container and the lock bolt on the electronic tag is inserted into the holes of the container door handle and the door seal turnover panel. The lock cap screws to the lock bolt tightly, so that the lock bolt can not be pulled out from the electronic tag. The electronic tag adopts RFID technique, GPS satellite positing and identifying technique and un-touching approach switch door seal technique. When the lock cap screws onto the lock bolt, the door closing information is recorded; when the lock cap screws out from the lock bolt, the door opening information is recorded. The present invention identifies, reads and writes the freight information, logistics information, door seal information of the container through the electronic tag in an un-touching manner. The electronic tag has large storage volume, long life span, and good security. Besides, the electronic tag also has GPS that can position and identify the position of the container.

The benefit result of the container electronic tag having positioning and electronic sealing function is that the present invention identifies the container information, tracks the logistics information during the freight, records the container door opening and closing information, and tracks the container position in real-time, which can greatly improve the working efficiency of the container freight and reliability of the identification, read and write of the container information, and ensure the cargo safety during the container freight.

These and other objectives, features, and advantages of the present invention will become apparent from the following detailed description, the accompanying drawings, and the appended claims.

DETAILED DESCRIPTION OF THE PREFERRED EMBODIMENT

Figure 1:
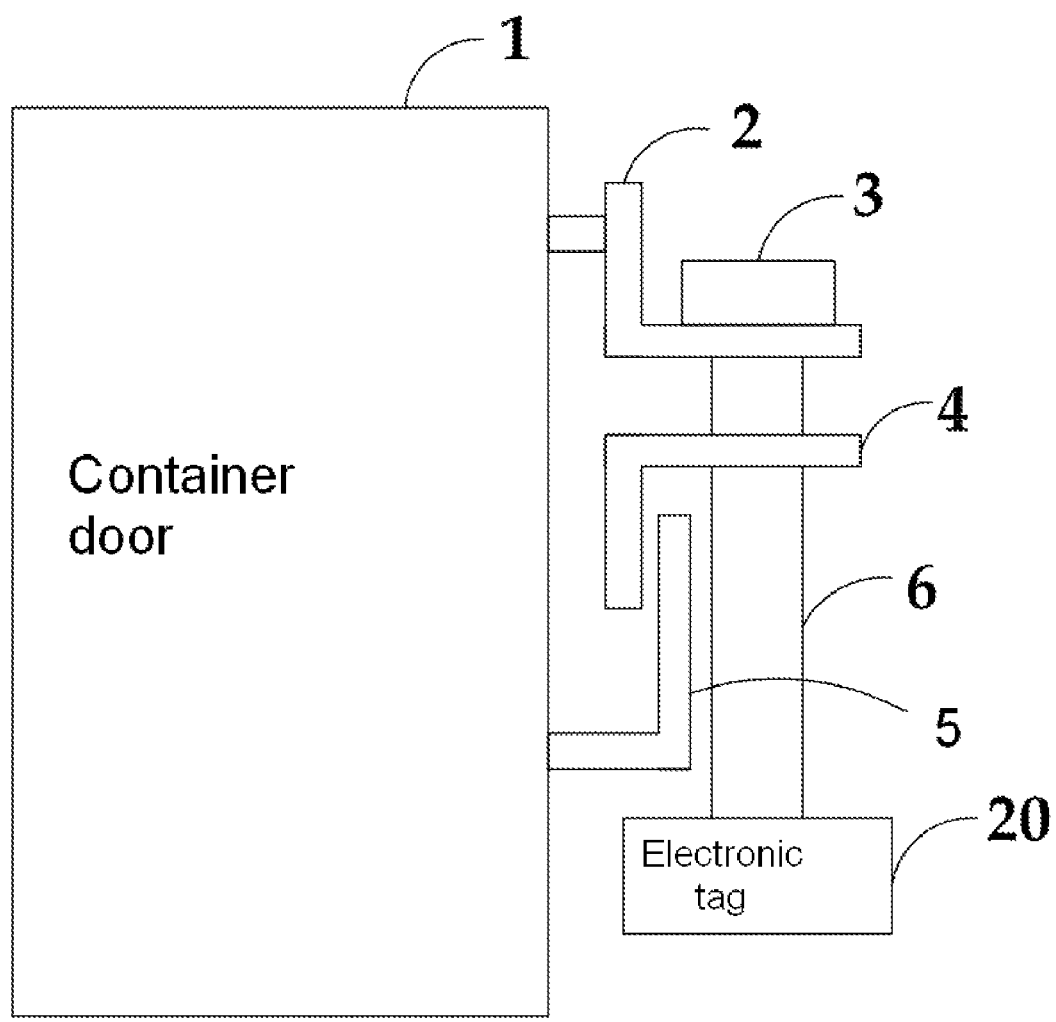
FIG. 1 illustrates a practical application of a container electronic tag arrangement having positioning and electronic sealing function according to a preferred embodiment of the present invention.
Figure 2:
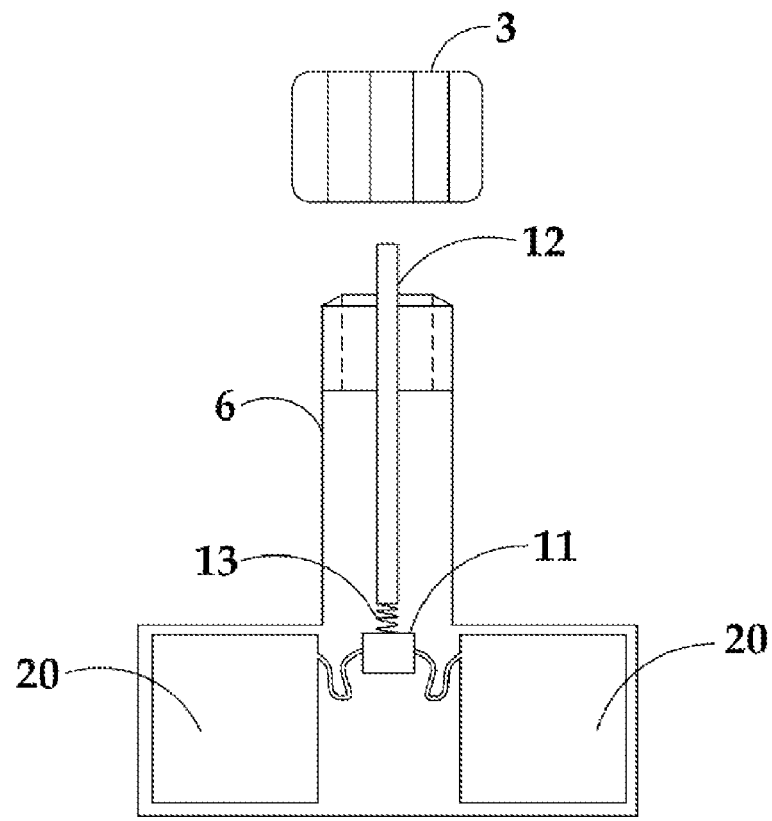
FIG. 2 is a schematic view of the container electronic tag arrangement having positioning and electronic sealing function according to the above preferred embodiment of the present invention.
Figure 4:
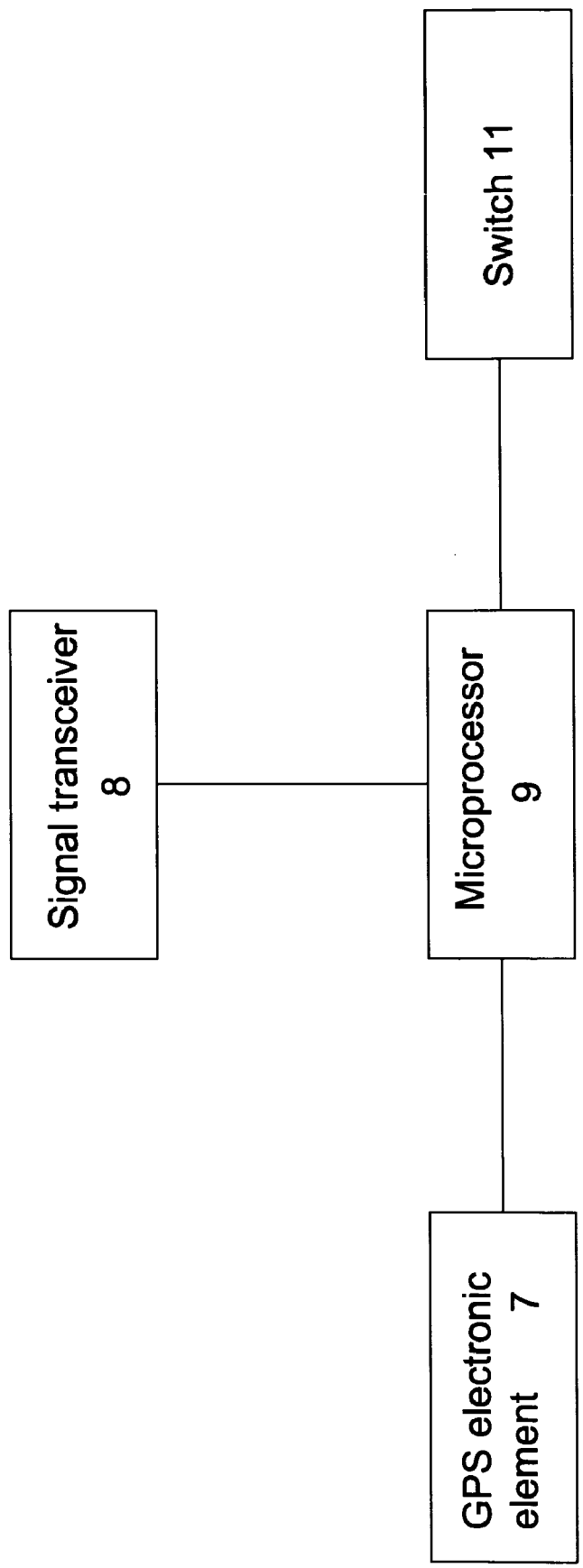
FIG. 4 is a block diagram of the electronic tag according to the above preferred embodiment of the present invention.

Referring to FIGS. 1, 2 and 4 of the drawings, a container electronic tag arrangement having positioning and electronic sealing function is illustrated. The container electronic tag comprises a container lock, an electronic tag 20, wherein the container lock comprises a lock bolt 6 and a lock cap 3, wherein the lock cap is integrated with the electronic tag 20; the electronic tag comprises a GPS electronic element 7, a signal transceiver 8, a microprocessor 9, and a switch, wherein the GPS electronic element 7 is a GPS positioning chip, or a reader/writer with GPS function. The switch 11 can be embodied as a limit switch, or can be embodied as an un-touching approach switch. The electronic tag 20 is placed under a door holder 5 on the right side of the container door 1. When the container door is closed, rotate the door handle 4, press it into the door holder 5, turn over a door sealing turn-over panel 2, and insert the lock bolt 6 on the electronic tag 20 into the hole of the door handle 4 and the door sealing turn-over panel 2. The lock cap 3 is connected with the lock blot 6 by drum thread. A movable transmitting pole 12 can be provided between the lock bolt 6 on the electronic tag 20, and the bottom edge of the transmitting pole 12 is connected to the limit switch or the un-touching approach switch through a spring 13. When the lock cap 3 is screwed into the lock bolt 6, the limit switch or the un-touching approach switch in the electronic tag 20 sends a signal to the microprocessor 9, and the microprocessor 9 records the time information that is the time when the container is closed. Due to the support of the lock cap 3, the electronic tag 20 is secured on the door sealing turnover panel of the container.

Figure 3:
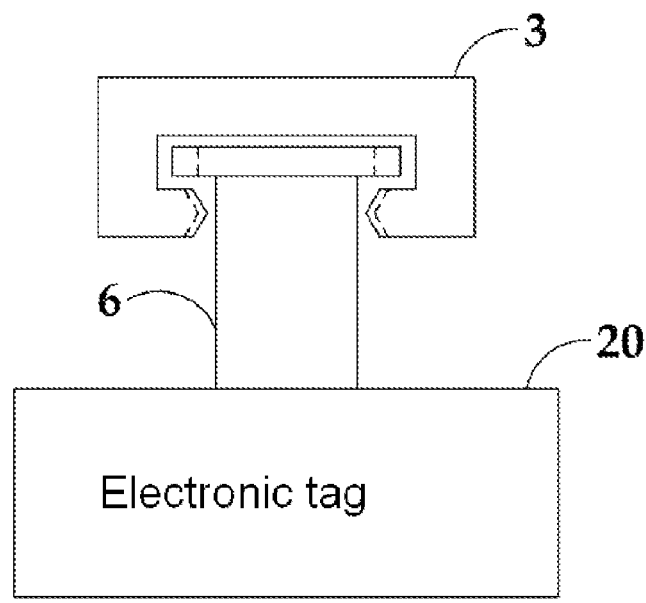
FIG. 3 is a schematic figure of the electronic tag and lock cap according to the above preferred embodiment of the present invention.

Referring to FIGS. 3 and 4 of the drawings, the lock cap 3 has an inner drum thread, and has a magnet imbedded thereon. When the lock cap 3 is screwed onto the column thread of the lock bolt 6 on the electronic tag 20, the column thread of the lock bolt 6 on the electronic tag 20 rotates clockwise into the cavity of the lock cap 3. The lock cap 3 can not rotate out from the lock bolt 6 on the electronic tag 20 without external applied force. When open the container, the clock cap 3 rotates counter clockwise under an external applied force, so as to detach from the lock bolt 6 on the electronic tag. The limit switch or un-touching approach switch in the electronic tag acts, and the microprocessor 9 records the container opening time information.

Referring to FIGS. 2 and 4 of the drawings, the electronic tag 20 comprises a GPS electronic element 7, a signal transceiver 8, and a limit switch or un-touching approach switch. When the GPS electronic element is GPS positioning chip, the container's position when the container is open or close can be determined by satellite; when the GPS electronic element 7 is an external reader/writer with GPS function to the electronic tag, which can record the geographical information of the container. The frequency of the signal transceiver 8 can be single frequency or double frequency. The un-touching approach switch can adopt capacitor, induction, and Hall element, according to its operating principle. The opening and closing information of the door seal is recorded in the storage unit of the microprocessor 9. The storage unit also stores the information about the container body, freightage, and logistics.

As shown in FIG. 1 of the drawings, the electronic tag 20 is mounted under the door holder on the front and right side of the container door. The wireless RF signal can read the information about the container body, freightage, logistics and door seal stored in the storage unit of the microprocessor 9 in the electronic tag 20, and also can write the information about freightage, logistics and so on during the freight into the storage unit of the microprocessor 9 in the electronic tag 20

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A container electronic tag arrangement having positioning and electronic sealing function used on a container having a door that comprises a door handle and door seal turnover panel, comprising:

an electronic tag mounted on a front and right side of the container, comprising a GPS electronic element for detecting the container position while opening and closing, a signal transceiver for transmitting and receiving information signals, a microprocessor for recording container position information while opening and closing, and a switch for sending opening and closing signals to said microprocessor; and a container lock comprises a lock bolt integrated with said electronic tag and a lock cap adapted for screwing onto said lock bolt, whereby while insert said lock bolt on said electronic tag into a hole of the door handle and the door sealing turnover panel respectively, and screw said lock cap onto said lock bolt, said switch sends signal to said microprocessor, and said microprocessor records the opening and closing information, wherein said electronic tag further comprises a moveable transmitting pole provided in middle of said block bolt of said electronic tag, wherein said transmitting pole comprises an elastic element mounted thereunder connecting to said switch.

2. The container electronic tag arrangement, as recited in claim 1, wherein said lock cap has a cavity therein for receiving said lock bolt, whereby when said lock cap is screwed out from said lock bolt, said holes of the door handle and door seal turnover panel are detached.

3. A container electronic tag arrangement having positioning and electronic sealing function used on a container having a door that comprises a door handle and door seal turnover panel, comprising:

an electronic tag mounted on a front and right side of the container, comprising a GPS electronic element for detecting the container position while opening and closing, a signal transceiver for transmitting and receiving information signals, a microprocessor for recording container position information while opening and closing, and a switch for sending opening and closing signals to said microprocessor; and a container lock comprises a lock bolt integrated with said electronic tag and a lock cap adapted for screwing onto said lock bolt, whereby while insert said lock bolt on said electronic tag into a hole of the door handle and the door sealing turnover panel respectively, and screw said lock cap onto said lock bolt, said switch sends signal to said microprocessor, and said microprocessor records the opening and closing information, wherein said lock cap has inner drum thread, and comprises a magnet imbedded thereon.

* * * * *